United States Patent
Takasu et al.

(10) Patent No.: US 8,413,778 B2
(45) Date of Patent: Apr. 9, 2013

(54) ONE-WAY CLUTCH OF ROLLER TYPE

(75) Inventors: Yasuhide Takasu, Fukuroi (JP); Shinya Okuma, Fukuroi (JP); Tomoharu Ando, Fukuroi (JP); Tetsuya Wakamori, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 683 days.

(21) Appl. No.: 12/617,788

(22) Filed: Nov. 13, 2009

(65) Prior Publication Data
US 2010/0116610 A1    May 13, 2010

(30) Foreign Application Priority Data
Nov. 13, 2008 (JP) ................................ 2008-291041

(51) Int. Cl.
*F16D 41/067* (2006.01)
(52) U.S. Cl.
USPC .............................. 192/45.016; 192/45.008
(58) Field of Classification Search ............. 192/45.006, 192/45.008, 45.013, 45.016
See application file for complete search history.

(56) References Cited

U.S. PATENT DOCUMENTS

| 4,236,619 A * | 12/1980 | Kuroda ............... 192/45.016 |
| 5,007,514 A * | 4/1991 | Hattori et al. ......... 192/45.012 |
| 7,055,666 B2 * | 6/2006 | Nishimura et al. ....... 192/45.1 |
| 2009/0277739 A1 * | 11/2009 | Takasu .................. 192/45 |

FOREIGN PATENT DOCUMENTS

| JP | 60-150336 U | 10/1985 |
| JP | 3-112138 U | 11/1991 |
| JP | 05-044615 A | 2/1993 |
| JP | 05-044615 A | 2/1993 |
| JP | 2008-261488 A | 10/2008 |

OTHER PUBLICATIONS

Office Action issued Jun. 13, 2012 in Japanese Patent Application No. 2008-291041.

* cited by examiner

*Primary Examiner* — Richard M. Lorence
(74) *Attorney, Agent, or Firm* — Miles & Stockbridge P.C.

(57) ABSTRACT

A one-way clutch comprising an outer race provided with a pocket and having a groove portion formed at an inner diameter side of an axial one end face of the outer race, an inner race arranged coaxially with the outer race, a roller disposed in the pocket and adapted to transmit torque between the outer race and the inner race, a cage having a cylindrical portion with a window and a flange portion extending from an axial one end face of the cylindrical portion in an outer diameter direction, a projection provided on the cylindrical portion, a spring disposed in the pocket between the outer race and the roller and adapted to bias the roller toward an engagement direction with respect to the cam surface, and a side plate secured to abut against the axial one end face of the outer race and provided at its inner diameter portion with spline grooves, and wherein the cage is prevented from being rotated relative to the outer race by fitting the projection in the groove portion.

3 Claims, 3 Drawing Sheets

ONE-WAY CLUTCH OF ROLLER TYPE

This application claims the benefit of Japanese Patent Application No. 2008-291041, filed Nov. 13, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed in the pocket and adapted to transmit torque between the outer peripheral track surface of the inner race and the inner peripheral cam surface of the outer race, and a spring contacted with an idle rotation side of the roller.

With this arrangement, in the one-way clutch of roller type, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race via the cam mechanism only in an opposite direction.

For example, in many cases, since a one-way clutch used as a starter of a motor bike is used under a high speed rotation and severe vibration environment and an environment including a large amount of powder dust, foreign matters such as dust including worn powder are apt to be accumulated in the one-way clutch. Since the foreign matters accumulated in the one-way clutch affect a bad influence upon engaging performance, it is desirable to remove the foreign matters promptly in order to enhance reliability of the one-way clutch.

On the other hand, in some one-way clutches of roller type used as the starter of the motor bike, as disclosed in Japanese Patent Application Laid-open No. 5-044615 (1993), by providing side plates on both sides of an outer race of the one-way clutch, rollers used in the one-way clutch and springs for biasing the springs are prevented from being dislodged.

Further, in order to enhance the performance of the one-way clutch, it has been proposed to lubricate the members. For example, the above-mentioned Japanese Patent Application Laid-open No. 5-044615 (1993) discloses an arrangement in which a one-way clutch is lubricated by oil. Further, some one-way clutches have been used under a dry condition without oil lubrication.

However, when the one-way clutch as disclosed in the above-mentioned Japanese Patent Application Laid-open No. 5-044615 (1993) is used under a severe vibration environment and an environment in which it is hard to lubricate the one-way clutch, since the side plates are attached to the both sides of the outer race, foreign matters such as dust including worn powder accumulated in the clutch are hard to be discharged, and, the dust accumulated in the clutch affects a bad influence upon operations of rollers and springs, which may causes wear of the rollers, thereby worsening the reliability of the one-way clutch.

Further, since the side plates must be secured to the both sides of the outer race and holes or recesses for housing the springs must be formed in the outer race, the number of manufacturing steps is increased, thereby increasing a manufacturing cost.

Further, in a case where the one-way clutch is used in a motor bike subjected to the severe vibration, if a cage may be rotated relative to the outer race, the cage may be rotated in an undesirable direction with respect to the pockets of the outer race, thereby affecting a bad influence upon engaging performance of the one-way clutch.

In this way, in the one-way clutch used as the starter of the motor bike having the side plates, it is desired to provide a one-way clutch of roller type in which the engaging reliability can be maintained and the cost is reduced, even under the high speed rotation and severe vibration condition and a service condition in which it is hard to lubricate the one-way clutch and the foreign matters such as the dust including the worn powder are apt to be accumulated.

SUMMARY OF THE INVENTION

Accordingly, an object of the present invention is to provide a one-way clutch of roller type wherein engaging reliability is enhanced by providing an arrangement in which foreign matters such as dust including worn powder accumulated in the one-way clutch of roller type can easily be discharged and to realize reduction in cost by reducing the number of manufacturing steps.

To achieve the above object, the present invention provides a one-way clutch of roller type comprising an annular outer race provided at its inner periphery with at least one pocket formed as a recessed portion including a cam surface and having an annular stepped portion formed at an inner diameter side of an axial one end face of the outer race and also having at least one groove portion formed at an inner diameter side of the other axial end face; an inner race spaced apart from the outer race toward a radial inner diameter side of the outer race and coaxially arranged for a relative rotational movement and having an annular outer peripheral track surface; a roller disposed in the pocket and adapted to transmit torque between the outer peripheral track surface of the inner race and the inner peripheral cam surface of the outer race; a cage having a cylindrical portion disposed between the outer race and the inner race and including a window for holding the roller, an annular flange portion extending from an axial one end face of the cylindrical portion in an outer diameter direction and fitted in the stepped portion of the outer race, and at least one projection extending from the cylindrical portion in the outer diameter direction; a spring disposed in the pocket between the outer race and the roller and adapted to bias the roller toward an engagement direction with respect to the cam surface; and a side plate secured to the axial end face of the outer race and provided at its inner diameter portion with spline grooves and having at least one hole communicating with the pocket of the outer race; and wherein the cage is prevented from being rotated relative to the outer race by fitting the projection of the cylindrical portion of the cage into the groove portion of the outer race.

Further, preferably, in the one-way clutch of roller type according to the present invention, the projection of the cylindrical portion of the cage is constituted by an i-bar shaped projection integrally extending from the cylindrical portion of the cage in the outer diameter direction.

Further, preferably, in the one-way clutch of roller type according to the present invention, the i-bar shaped projection is inclined in an axial direction in such a manner that a diameter of the projection is increased toward the axial direction opposite to the flange portion.

Further, preferably, in the one-way clutch of roller type according to the present invention, the spring is constituted by an accordion spring, and one end of the spring is secured to the axial end face of the outer race in which the groove portion is formed by welding and the other end of the spring is pinched between an axial end face of the roller and the annular flange portion of the cage.

Further, preferably, in the one-way clutch of roller type according to the present invention, the window of the cage is provided with a roller receiving portion for receiving the roller, at an outer diameter side edge portion of a circumferential one end of the window near the cam surface.

Further, the present invention provides a one-way clutch of roller type comprising an annular outer race provided at its inner periphery with at least one pocket formed as a recessed portion including a cam surface and having an annular stepped portion formed at an inner diameter side of an axial one end face of the outer race; an inner race spaced apart from the outer race toward a radial inner diameter side of the outer race and coaxially arranged for a relative rotational movement and having an annular outer peripheral track surface; a roller disposed in the pocket and adapted to transmit torque between the outer peripheral track surface of the inner race and the inner peripheral cam surface of the outer race; a cage having a cylindrical portion disposed between the outer race and the inner race and including a window for holding the roller, an annular flange portion extending from an axial one end face of the cylindrical portion in an outer diameter direction and fitted into the stepped portion of the outer race, and at least one projection extending from the cylindrical portion in the outer diameter direction; a spring disposed in the pocket between the outer race and the roller and adapted to bias the roller toward an engagement direction with respect to the cam surface; and a side plate secured to the axial end face of the outer race on which the annular stepped portion is provided and provided at its inner diameter portion with spline grooves and having at least one hole communicating with the pocket of the outer race; and wherein the cage is prevented from being rotated relative to the outer race by fitting a protruded portion provided on the flange portion of the cage into pocket of the outer race.

Further, preferably, in the one-way clutch of roller type according to the present invention, the protruded portion provided on the cage is integrally formed with the annular flange portion of the cage.

In the one-way clutch of roller type according to the present invention, since the cage is prevented from being rotated relative to the outer race by fitting the projection provided on the cage into a groove portion provided in the outer race, even under a severe vibration environment, the engaging performance of the clutch can be maintained. Further, by fitting the annular flange portion of the cage into the annular stepped portion of the outer race and by securing the side plate to the outer race in such a manner that an axial end face of the side plate abuts against the axial end face of the outer race on which the stepped portion is provided, the dislodgement of the cage can be prevented.

In addition, by the side plate provided at its inner diameter portion with the spline grooves for transmitting a power between the outer race and a crankshaft of an engine, and by the cage having the window for holding the roller and the annular flange portion, the roller can be prevented from being dislodged from the cage in the axial direction.

Further, by securing one end of the spring to the axial end face of the outer race by the welding, and by pinching the other end of the spring between the axial end face of the roller and the annular flange portion of the cage, the operation of the spring can be stabilized and the dislodgement of the spring can be prevented.

Accordingly, in the one-way clutch of roller type according to the present invention, a side plate which was conventionally provided on the other axial end face of the outer race opposite to the axial end face on which the stepped portion is provided can be omitted or eliminated, with the result that (due to the elimination of the side plate at one side of the outer race) one side of the axial end faces of the one-way clutch is opened or exposed, so that foreign matters such as dust including worn powder can be discharged from the opened axial side of the one-way clutch, thereby preventing the accumulation of the dust and wear of the roller, spring, inner race and cam surface of the outer race which would be caused by the accumulation of the dust.

Further, by designing so that the projection provided integrally with the cylindrical portion of the cage is formed as the i-bar shaped projection and the projection is inclined in the axial direction in such a manner that the diameter of the projection is increased from the axial one end face toward the other end face of the outer race, foreign matters such as dust including worn powder accumulated in the inner race can be shifted along the inclination of the i-bar shaped projection and then be discharged from the opened axial one side of the one-way clutch, thereby preventing the accumulation of the dust in the inner race.

In addition, by forming at least one hole communicating with the pocket of the outer race in the side plate, the foreign matters such as dust including worn powder accumulated in the pocket can also be discharged from the axial end face of the side plate.

Accordingly, there can be provided a reliable one-way clutch of roller type in which a function of the clutch can be maintained adequately even when the clutch is used under the high rotation and severe vibration environment and the environment in which it is hard to lubricate the clutch and which includes a large amount of powder dust.

Further, by eliminating one of the side plates, since holes or recesses for housing the springs are not required to form in the outer race and a step for securing the side plate to the outer race can be omitted, the manufacturing cost can be reduced.

On the other hand, in plate of the projection and the groove portion, even by providing at least one protruded portion extending from the annular flange portion of the cage in the outer diameter direction and by fitting the protruded portion into the pocket of the outer race, the cage can be prevented from being rotated relative to the outer race.

In plate of the projection and the groove portion, even by providing the protruded portion and by fitting the protruded portion into the pocket, similar reliability can be obtained, and, since it is not required to provide the projection and the groove portion, the cost can be further reduced.

Further, by providing the roller receiving portion for receiving the roller at the outer diameter side edge portion of the circumferential one end portion of the window of the cage near the cam surface to pinch the roller between the window and the spring, even in a condition that the inner race is not mounted, since the roller can be prevented from being dislodged in the radial direction and the falling of the roller during the assembling of the one-way clutch can be prevented, the assembling and transportation of the one-way clutch can be facilitated.

Further features of the present invention will become apparent from the following description of exemplary embodiments with reference to the attached drawings.

DETAILED DESCRIPTION OF THE INVENTION

Figure 1:
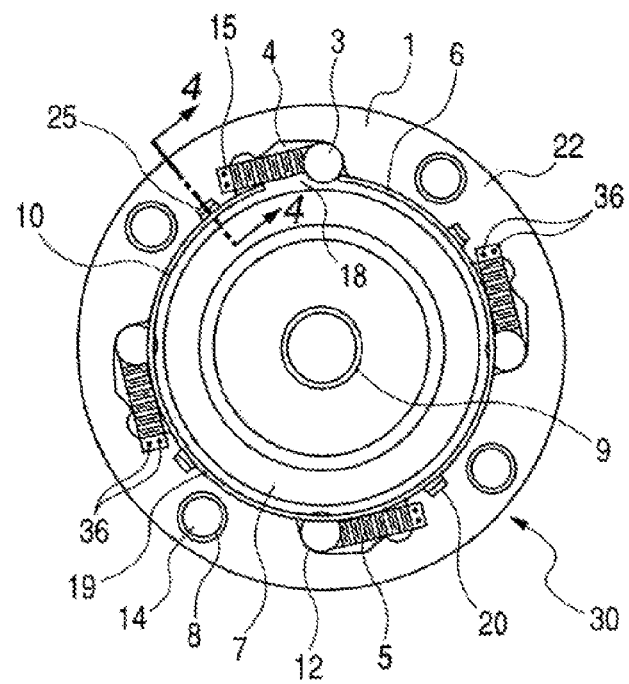
FIG. 1 is a front view showing a one-way clutch of roller type according to an embodiment of the present invention in a condition that the clutch is engaged under a high load.

Now, embodiments of the present invention will be fully explained with reference to the accompanying drawings. Incidentally, in the drawings, same or similar parts or elements are designated by the same reference numerals. Further, it should be noted that the embodiments which will be described below are merely examples and other alterations and modifications can be made.

Figure 2:
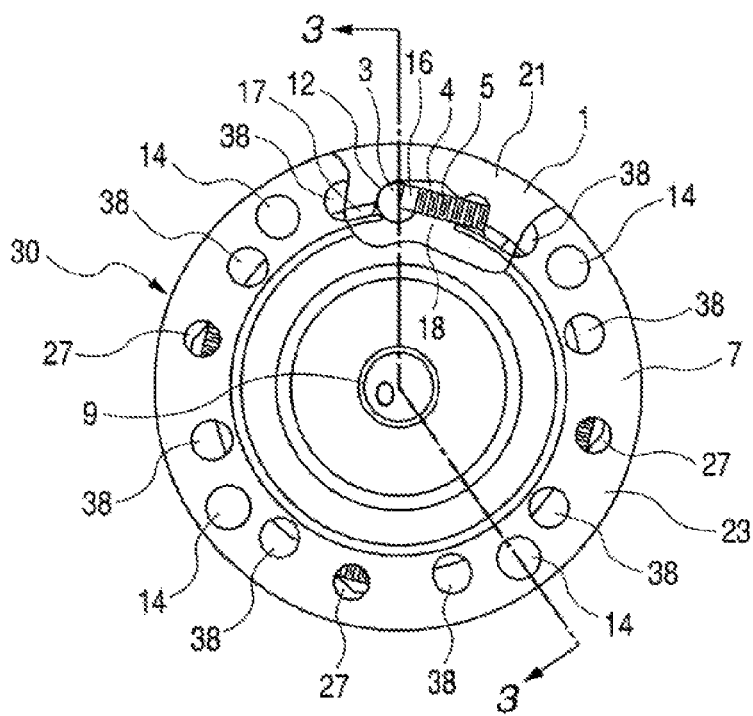
FIG. 2 is a front view looked at from a rear side of FIG. 1.

FIG. 1 is a front view showing a one-way clutch of roller type according to an embodiment of the present invention, and FIG. 2 is a front view looked at from a rear side of FIG. 1. Further, FIG. 3 is a sectional view taken along the line 3-O-3 of FIG. 2.

Figure 3:
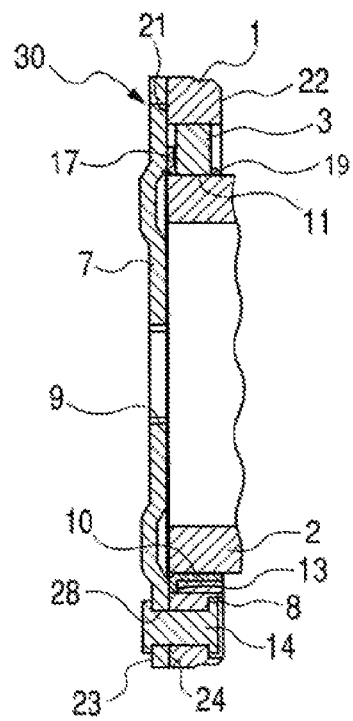
FIG. 3 is a sectional view taken along the line 3-O-3 of FIG. 2.

FIGS. 1 to 3 show a condition that rollers are engaged by cam surfaces, i.e. a condition that the one-way clutch is engaged under a high load and is locked.

As shown in FIGS. 1 to 3, a one-way clutch 30 of roller type comprises an annular outer race 1 provided at its inner periphery with a plurality of pockets 4 formed as recessed portions having cam surfaces 12, an inner race 2 spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface 11 of the inner race 2 and the inner peripheral cam surfaces 12 of the outer race 1, springs 5 disposed in the respective pockets 4 and adapted to bias the rollers 3 toward engagement directions with respect to the cam surfaces 12, a cage 6 for holding the rollers 3, and a side plate 7 provided at its inner diameter portion with spline grooves 9 with which a crankshaft of an engine can be engaged and secured to the outer race 1 by rivets 14.

In the illustrated embodiment, there are four pockets 4 provided in the outer race 1, which pockets are disposed equidistantly along a circumferential direction. Further, four holes 8 used for securing the side plate 7 to the outer race 1 by means of the rivets 14 and extending through the outer race in an axial direction are also disposed equidistantly along the circumferential direction, and the pockets 4 and the holes 8 are arranged alternately and equidistantly along the circumferential direction. Of course, it should be noted that the number of the pockets 4 can be set to be three to six, for example, in accordance with the magnitude of the torque.

Further, in the illustrated embodiment, while an example that the side plate is secured to the outer race by the rivets was explained, the side plate can be secured to the outer race by using other members such as bolts.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 2, the flange portion 17 and the side plate 7 are partially broken so that the pockets 4 can be seen.

Further, the cage 6 has a plurality of windows 18 which are arranged equidistantly along the circumferential direction and the number of which corresponds to the number of rollers 3. The window 18 extends through the cage in the radial direction, but, in the axial direction, both an end of the window near the flange portion 17 and an end 19 remote from the flange portion 17 are closed. That is to say, the roller 3 is seated in a substantially rectangular window 18 encircled at its four sides, thereby preventing the roller 3 from being dislodged in the axial direction. To show a relationship between the window 18 and the roller 3, in FIG. 1, the end 19 of the uppermost window 18 is broken away.

One end i.e. tab 15 of each spring 5 is locked to the axial end face 22 of the outer race 1 by welding, as shown in FIG. 1, and, the other end i.e. tab 16 of the spring is pinched between an axial end face of the roller 3 and the flange portion 17 of the cage 6, as shown in FIG. 2. With this arrangement, the spring 5 itself is fixedly supported with respect to the outer race 1, with the result that dislodgement of the spring 5 can be prevented and, at the same time, a movement of the roller 3 can be stabilized.

Figure 5:
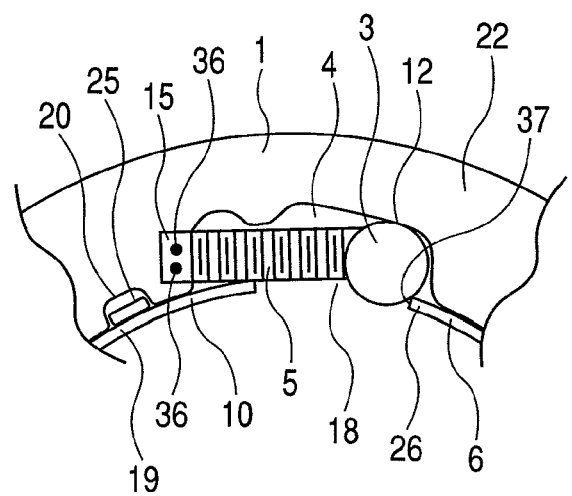
FIG. 5 is an enlarged partial front view showing a pocket of FIG. 1 and therearound.

In the illustrated embodiment, although an accordion spring is used as the spring 5, other type of spring such as a coil spring can be used. Further, as shown in FIGS. 1 and 5, the end 15 of the spring 5 is secured to the outer race 1 by spot welding. Two spot welded portions 36 are provided on the end 15 of the spring. However, the securing of the end 15 can be achieved by another way such as welding, adhesive or soldering, for example.

Further, as shown in FIG. 3, the side plate 7 is provided with guide holes 28 into which the rivets 14 can be inserted, in correspondence to the respective holes 8 of the outer race 1. By inserting the rivet 14 into the guide hole 28 and the hole 8 of the outer race 1 and by caulking the rivet 14, the side plate 7 is secured to the outer race 1. Incidentally, as shown in FIG. 2, guide holes 38 utilized for the caulking of the rivet 14 are provided on both sides of the guide hole 28 of the side plate 7 along the circumferential direction.

As shown in FIG. 1, plural (four in the illustrated embodiment) groove portions 20 extending in the axial direction are provided in an inner diameter portion of the axial end face 22 of the outer race 1, and plural (four in the illustrated embodiment) projections 25 (described later) are provided on the cylindrical portion of the cage 6, and the number of the projections corresponds to the number of the groove portions 20. The groove portion 20 is positioned between the pocket 4 and the hole 8 in the circumferential direction.

It should be noted that the numbers of the groove portions 20 and the projections 25 may be changed to be three to six for example, if necessary.

Figure 4:
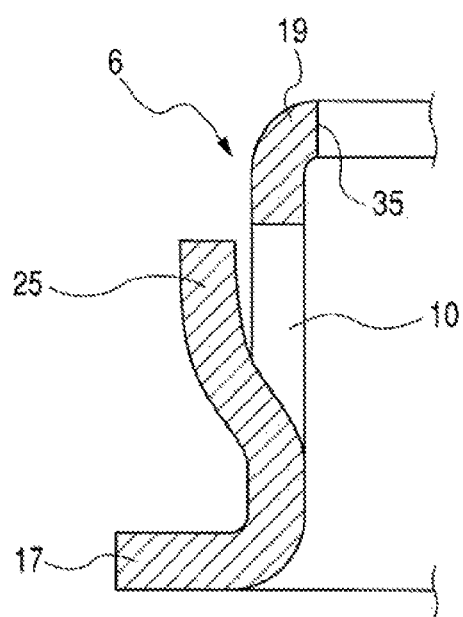
FIG. 4 is an enlarged sectional view of a cage of the one-way clutch of roller type according to the embodiment of the present invention, taken along the line 4-4 of FIG. 1.

FIG. 4 is an enlarged sectional view of the cage 6 of the one-way clutch of roller type according to the embodiment of the present invention, taken along the line 4-4 of FIG. 1.

As shown in FIG. 4, the projection 25 extends from the cylindrical portion 10 of the cage 6 toward an outer diameter direction. The projection 25 is formed by cutting a part of the cylindrical portion 10 and bending the cut part toward the outer diameter direction and is formed as an i-bar shaped projection extending in the axial direction. Four projections 25 are provided integrally with the cylindrical portion 10 and are arranged equidistantly along the circumferential direction. At the end 19 opposite to the flange portion 17 in the axial direction, an annular guide surface 35 is formed on the inner diameter portion. The guide surface 35 can be slidingly contacted with the inner race 2 positioned at the inner diameter side of the cage 6 and serves to guide an outer peripheral surface of the inner race 2.

By fitting the projections 25 of the cage 6 into the groove portions 20 of the outer race 1, the cage 6 is prevented from being rotated relative to the outer race 1. Further, as shown in FIGS. 2 and 3, an annular stepped portion 13 is provided on an inner diameter portion of the axial end face 21 of the outer race 1, and the flange portion 17 of the cage 6 is engaged by the stepped portion 13. By securing the side plate 7 to the outer race 1 so that the flange portion 17 of the cage 6 is engaged by the stepped portion 13 and an axial end face 24 of the side plate 7 abuts against the axial end face 21 of the outer race 1, the dislodgement of the cage 6 can be prevented.

In this way, in the one-way clutch of roller type according to the present invention, by fitting the projections 25 into the groove portions 20, since the rotation of the cage 6 relative to the outer race is limited to become a fixed condition, even under the sever vibration environment, the cage 6 is not rotated intentionally relative to the outer race 1, and thus, the engaging performance of the rollers 5 is not reduced. Further, since the side plate 7 is secured to the outer race 1 to prevent the dislodgement of the cage 6 in the axial direction, it is not required to provide an additional side plate on the axial end face 22 of the outer race 1.

Accordingly, the foreign matters such as dust including worn powder can be discharged from the opened (due to omission of the side plate) axial end face 22 of the outer race 1, thereby preventing the accumulation of the dust and wear of the roller, spring, inner race and cam surface of the outer race which would be caused by the accumulation of the dust.

Further, as shown in FIG. 4, by designing so that the i-bar shaped projection 25 is inclined in the axial direction in such a manner that a diameter of the projection is increased from the axial one end face 21 toward the other end face 22 of the outer race, foreign matters such as dust including worn powder accumulated in the inner race 2 can be shifted along the inclination of the i-bar shaped projection 25 and then be discharged from the opened axial one side 22 of the outer race 1, thereby preventing the accumulation of the dust in the inner race 2.

Further, as shown in FIG. 2, the side plate 7 is provided with plural (four in the illustrated embodiment) holes 27 (the number of which corresponds to the number of the pockets 4). Thus, foreign matters such as dust including worn powder accumulated in the pockets 4 can be discharged from an axial end face 23 of the side plate 7 through the holes 27, thereby further preventing the accumulation of the dust in the pockets.

FIG. 5 is an enlarged partial view showing the pocket 4 and therearound of the one-way clutch of roller type shown in FIG. 1. In FIG. 5, to show a relationship between the window 18 and the roller 3, the end 19 is partially broken away.

As shown in FIG. 5, at a circumferential edge portion 26 of the window 18 provided in the cage 6, there is provided a roller receiving portion 37 for receiving the roller 3 in a condition that the inner race 2 is not mounted to the one-way clutch. The roller receiving portion 37 can be formed by chamfering the edge portion 26.

Accordingly, even in the condition that the inner race 2 is not mounted, since the roller 3 can be seated on the roller receiving portion 37 to be biased by the spring 5, the roller 3 can be prevented from being dislodged in the radial direction and, thus, the falling of the roller during the assembling of the one-way clutch can be prevented, thereby facilitating the assembling and transportation of the one-way clutch.

Figure 6:
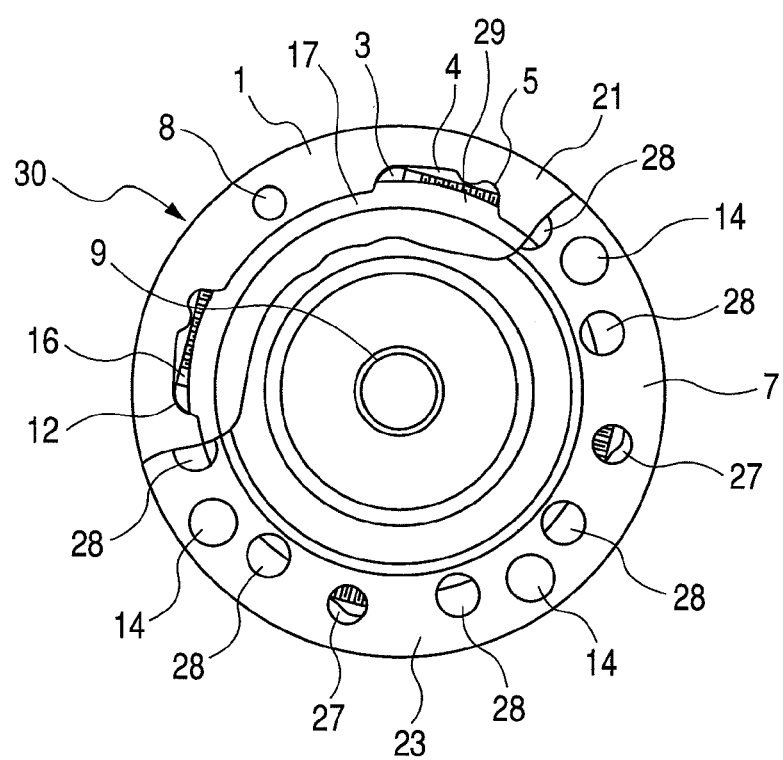
FIG. 6 is a front view showing a one-way clutch of roller type according to another embodiment of the present invention.

FIG. 6 is a front view showing a one-way clutch of roller type according to another embodiment of the present invention.

As shown in FIG. 6, a cage 6 is provided with a plurality (four in the illustrated embodiment) of protruded portions 29 extending integrally from a flange portion 17 in an outer diameter direction. The number of the protruded portions 29 corresponds to the number of the pockets 4 and each protruded portion is fitted in an opening portion at an inner diameter side of the corresponding pocket 4. In FIG. 6, to show a relationship between the pocket 4 and the protruded portion 29, the side plate 7 is partially broken.

In this way, by fitting the protruded portions 29 into the respective pockets 4, since the cage 6 cannot be rotated relative to the outer race 1 to be maintained in a fixed condition, even under a sever vibration environment, the cage 6 is not rotated intentionally relative to the outer race 1, and thus, the engaging performance of the rollers 5 is not reduced.

The protruded portions 29 can be formed simultaneously when the flange portion 17 of the cage is formed by press working. Alternately, the protruded portions may be formed separately from the flange portion 17 and then be secured to the flange portion 17 of the cage 6 by welding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A one-way clutch of roller type comprising:

an outer race provided at its inner periphery with at least one pocket including a cam surface and having an annular stepped portion formed at an inner diameter side of one axial end face of said outer race and also having at least one groove portion formed at an inner diameter side of the other axial end face;

an inner race spaced apart from said outer race toward a radial inner diameter side of said outer race and coaxially arranged for a relative rotational movement;

a roller disposed in said pocket and adapted to transmit torque between said outer race and said inner race when engaged by said cam surface;

a cage having a cylindrical portion disposed between said outer race and said inner race and including a window for holding said roller, an annular flange portion extending from one axial end of said cylindrical portion in an outer diameter direction and fitted in said annular stepped portion of said outer race, and at least one projection extending from said cylindrical portion in the outer diameter direction;

a spring disposed in said pocket between said outer race and said roller and adapted to bias said roller toward an engagement direction with respect to said cam surface; and a side plate secured to the axial one end face of said outer race and provided at its inner diameter portion with spline grooves and having at least one hole communicating with said pocket of said outer race;

and wherein said projection is constituted by a bar member integrally extending from said cylindrical portion of said cage in the outer diameter direction, said projection has a portion inclined in an axial direction in such a manner that a projection amount of said projection is increased along axial direction away from said flange portion, and said cage is prevented from being rotated relative to said outer race by fitting said projection into said groove portion of said outer race.

2. A one-way clutch of roller type according to claim 1, wherein said spring is constituted by an accordion spring, and one end of said spring is secured to the other axial end face of said outer race by welding and the other end of said spring is pinched between an axial end face of said roller and said annular flange portion of said cage.

3. A one-way clutch of roller type according to claim 1, wherein said window of said cage is provided with a roller receiving portion for receiving said roller, at an outer diameter side edge portion of one circumferential end of said window near said cam surface.

* * * * *